(12) United States Patent
Hegde et al.

(10) Patent No.: US 12,313,779 B2
(45) Date of Patent: May 27, 2025

(54) DEPTH SENSING USING OPTICAL TIME-OF-FLIGHT TECHNIQUES THROUGH A TRANSMISSIVE COVER

(71) Applicant: ams-Osram Asia Pacific Pte. Ltd., Singapore (SG)

(72) Inventors: Pradeep Hegde, Frisco, TX (US); Timothy Cogan, McKinney, TX (US); Doug Nelson, Plano, TX (US); Drew Paterson, Plano, TX (US)

(73) Assignee: ams-Osram Asia Pacific Pte. Ltd., Singapore (SG)

( * ) Notice: Subject to any disclaimer, the term of this patent is extended or adjusted under 35 U.S.C. 154(b) by 1033 days.

(21) Appl. No.: 17/290,808

(22) PCT Filed: Nov. 13, 2019

(86) PCT No.: PCT/SG2019/050560
§ 371 (c)(1),
(2) Date: May 3, 2021

(87) PCT Pub. No.: WO2020/101576
PCT Pub. Date: May 22, 2020

(65) Prior Publication Data
US 2021/0405158 A1 Dec. 30, 2021

Related U.S. Application Data

(60) Provisional application No. 62/768,273, filed on Nov. 16, 2018.

(51) Int. Cl.
*G01C 3/08* (2006.01)
*G01S 7/481* (2006.01)
(Continued)

(52) U.S. Cl.
CPC ............ *G01S 7/4813* (2013.01); *G01S 7/497* (2013.01); *G01S 17/36* (2013.01); *G01S 2007/4975* (2013.01); *G01S 17/894* (2020.01)

(58) Field of Classification Search
CPC ........ G01S 7/4813; G01S 7/497; G01S 17/36; G01S 2007/4975
See application file for complete search history.

(56) References Cited

U.S. PATENT DOCUMENTS

| 2013/0116977 A1 | 5/2013 | Godbaz et al. |
| 2014/0313376 A1 | 10/2014 | Van Nieuwenhove et al. |

(Continued)

FOREIGN PATENT DOCUMENTS

| CN | 103998949 A | 8/2014 | |
| CN | 106104297 A | 11/2016 | |
| WO | WO 2015136100 A2 * | 9/2015 | ........... G01S 17/894 |

OTHER PUBLICATIONS

Chinese Office Action issued for the corresponding CN patent application No. CN 201980075120.9, dated Jul. 30, 2023, 14 pages (For informational purposes only).

(Continued)

*Primary Examiner* — Mark Hellner
(74) *Attorney, Agent, or Firm* — Viering, Jentschura & Partner mbB

(57) ABSTRACT

Techniques for determining dynamically the intensity of the reflection from a transmissive cover and neutralizing it so as to improve the accuracy of depth measurements. Depth measurements of light modulation at multiple frequencies—which also can be used for depth disambiguation—are obtained and used to decouple the information to estimate the intensity of the signal reflected by the transmissive cover itself or a smudge on the transmissive cover, and the intensity of the signal reflected by the target object.

15 Claims, 3 Drawing Sheets

(51) Int. Cl.
  *G01S 7/497* (2006.01)
  *G01S 17/36* (2006.01)
  *G01S 17/894* (2020.01)

(56) References Cited

U.S. PATENT DOCUMENTS

| | | |
|---|---|---|
| 2016/0124089 A1 | 5/2016 | Meinherz et al. |
| 2017/0038459 A1 | 2/2017 | Kubacki et al. |
| 2017/0234985 A1 | 8/2017 | Kadambi et al. |
| 2018/0059218 A1* | 3/2018 | Buettgen ................ G01S 7/497 |
| 2018/0059246 A1* | 3/2018 | Buettgen ............... G01S 7/4813 |
| 2018/0060700 A1* | 3/2018 | Bleyer ..................... G06T 7/10 |
| 2018/0100929 A1* | 4/2018 | O'Keeffe .............. G01S 17/931 |
| 2018/0106891 A1 | 4/2018 | Thurner |

OTHER PUBLICATIONS

International Search Report and Written Opinion for Application No. PCT/SG2019/050560 dated Feb. 4, 2020 (10 pages).
International Preliminary Report on Patentability for Application No. PCT/SG2019/050560 dated May 18, 2021 (7 pages).

* cited by examiner

DEPTH SENSING USING OPTICAL TIME-OF-FLIGHT TECHNIQUES THROUGH A TRANSMISSIVE COVER

FIELD OF THE DISCLOSURE

This disclosure relates to depth sensing using optical time-of-flight (TOF) techniques.

BACKGROUND

Some handheld computing devices such as smartphones can provide a variety of different optical functions such as one-dimensional (1D) or three-dimensional (3D) gesture detection, 3D imaging, time-of-flight or proximity detection, ambient light sensing, and/or front-facing two-dimensional (2D) camera imaging.

TOF sensors, for example, can be used to detect the distance to an object or to obtain 3D depth information. In general, TOF systems are based on a phase-measurement technique of emitted intensity-modulated light, which is reflected by one or more objects in a scene. The reflected light is imaged onto a sensor, and photo-generated electrons are demodulated in the sensor. Based on the phase information, the distance (or depth) to a point in the scene for each pixel in the sensor can be determined.

The TOF sensor sometimes is disposed beneath a cover glass of a host device (e.g., a smartphone). If contamination (i.e., a smudge) is present on the surface of the cover glass through which the light is emitted toward the scene, the smudge may reflect some of the emitted light back toward the detection pixels. Such situations can result in inaccurate estimates of the distance or depth data.

SUMMARY

The present disclosure describes techniques for determining dynamically the intensity of the reflection from a transmissive cover (e.g., a cover glass) and to neutralize it so as to improve the accuracy of depth measurements. Depth measurements of light modulation at multiple frequencies—which also can be used for depth disambiguation—are obtained and used to decouple the information to estimate the intensity of the signal reflected by the transmissive cover (i.e., the transmissive cover itself or a smudge on the transmissive cover) and the intensity of the signal reflected by the target object.

For example, in one aspect, the present disclosure describes a method including emitting light from a module at a first modulation frequency and emitting light at a second modulation frequency, wherein the light is emitted through a transmissive cover toward a target. The method includes measuring first amplitude and phase shift values representing a combination of an optical signal reflected by the target and an optical signal reflected by the transmissive cover in response to the light emitted at the first modulation frequency, and measuring second amplitude and phase shift values representing a combination of an optical signal reflected by the target and an optical signal reflected by the transmissive cover in response to the light emitted at the second modulation frequency. The method further includes estimating an amplitude of an optical signal reflected by the transmissive cover and an amplitude of an optical signal reflected by the transmissive cover, wherein the estimating is based, at least in part, on the measured first and second amplitude and phase shift values and on phase shift values obtained during calibration of the module.

In another aspect, the present disclosure describes an apparatus including aa transmissive cover, memory storing calibration-stage phase shift values, a light emitter and a depth camera. The light emitter is operable to emit light from a module at a first modulation frequency and operable to emit light at a second modulation frequency, wherein the light is emitted through the transmissive cover toward a target. The depth camera is operable to measure first amplitude and phase shift values representing a combination of an optical signal reflected by the target and an optical signal reflected by the transmissive cover in response to the light emitted at the first modulation frequency. The depth camera is further operable to measure second amplitude and phase shift values representing a combination of an optical signal reflected by the target and an optical signal reflected by the transmissive cover in response to the light emitted at the second modulation frequency. The apparatus includes processing circuitry operable to estimate an amplitude of an optical signal reflected by the transmissive cover and an amplitude of an optical signal reflected by the transmissive cover. The processing circuitry is operable to perform the estimating based, at least in part, on the measured first and second amplitude and phase shift values and on the calibration-stage phase shift values.

Some implementations include one or more the following features. For example, the phase shift values obtained during calibration of the module can represent, respectively, a phase shift value for an optical signal reflected by the transmissive cover and a phase shift value for an optical signal reflected by a target. Further, each of the optical signals reflected by the transmissive cover can include at least one of an optical signal reflected by the transmissive cover itself or an optical signal reflected by a smudge on the transmissive cover.

In some instances, estimating includes solving four non-linear equations for values of four unknown variables. The estimating can include, for example using an iterative process (e.g., gradient descent).

The amplitude values estimated by the processing circuitry can, in some instances, provide highly accurate data and can be used to modify various components of a host device or trigger other actions. Thus, in some implementations, a characteristic of a host device in which the module is disposed is adjusted in response to one or more of the estimated values. For example, the brightness of a display screen can be adjusted in response to one or more of the estimated values. Further, in some cases, it is determined, based on the estimated value of the amplitude of the optical signal reflected by the transmissive cover, that there may be a smudge on the transmissive cover, and in response to determining that there may be a smudge on the transmissive cover, an alert is generated. The alert can indicate, for example, that the transmissive cover should be cleaned to remove contamination on its surface.

Other aspects, features and various advantages will be readily apparent from the following detailed description, the accompanying drawings, and the claims.

DETAILED DESCRIPTION

Figure 1:
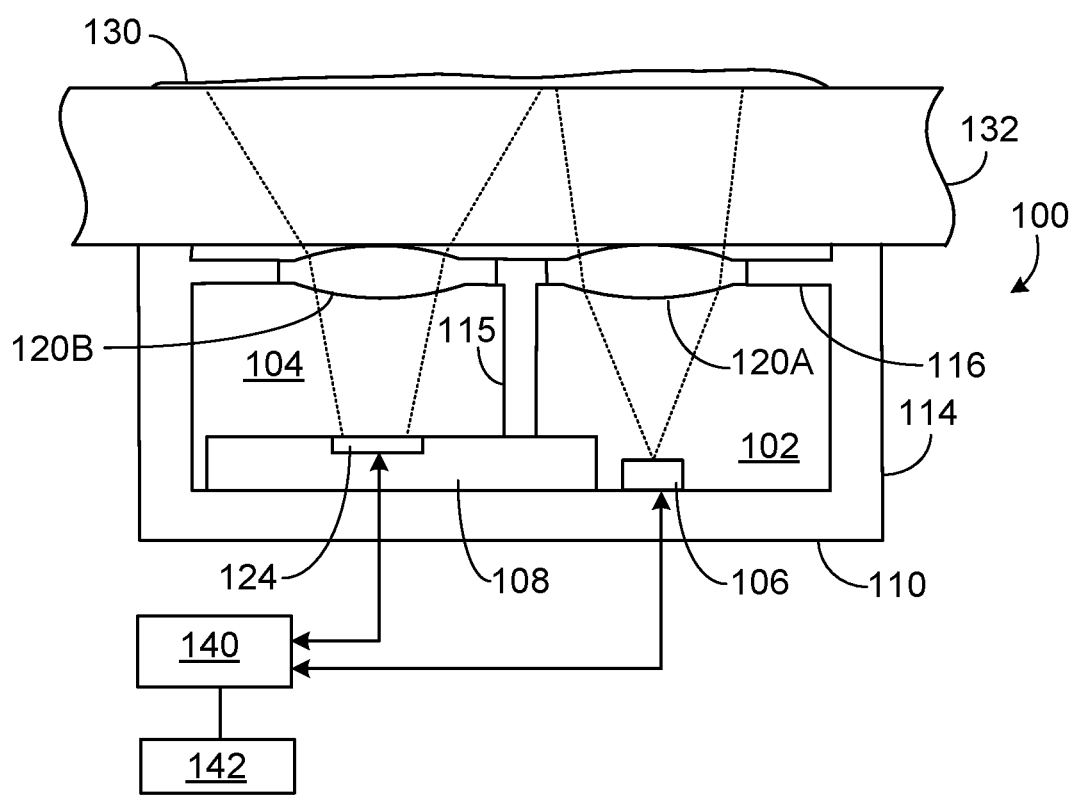
FIG. 1 illustrates an example of an optoelectronic module.

FIG. 1 illustrates an example of an optoelectronic module 100 that includes a light emission channel 102 and a light detection channel 104. A light emitter 106 and an optoelectronic depth camera 108 are mounted on a printed circuit board (PCB) or other substrate 110, which forms the bottom side of the module housing. The light emitter is operable to emit light at different modulation frequencies. In some implementations, the light emitter 106 is implemented as a laser diode or a vertical cavity surface emitting laser (VCSEL).

In the illustrated example, a spacer 114 is attached to the first side of the PCB 110 and separates the PCB 110 from an optics member 116. An interior wall 115 of the spacer 114 can provide optical isolation between the module's two chambers (i.e., the light emission chamber (channel) 102 and the light detection chamber (channel) 104). The optics member 116 can include one or more respective passive optical elements (e.g., lenses) 120A, 120B for each channel 102, 104. Light from the emitter 106 is directed out of the module 100 and, if reflected by an object back toward the module's detection channel 104, can be sensed by the depth camera 108.

The depth camera 108 includes an array of spatially distributed light sensitive elements (e.g., pixels) including active demodulation detection pixels 124, and also may include logic and other electronics to read and process the pixel signals. The pixels and other circuitry can be implemented, for example, in an integrated semiconductor chip (e.g., as a CCD or CMOS sensor). Although the number and arrangement of the demodulation detection pixels 124 can vary depending on the implementation, in some implementations, the demodulation detection pixels are arranged as a M×N array.

The depth camera 108 can be operable, for example, as an indirect time-of-flight (iTOF) sensor using single-photon synchronous detection (SPSD). The pixels 124 are operable to sense light at the wavelength(s) of light emitted by the emitter 106. In SPSD, a scene is illuminated with a sinusoidal or pseudo-sinusoidal light intensity. The distance, d, to a point in the scene can be estimated as:

$$d = (c * \phi)/(2 * 2\pi * f)$$

where c is the speed of light in vacuum, f is the modulation frequency, and $\phi$ is the measured phase difference between the outgoing light signal and the measured signal. The phase $\phi$ can be computed directly by counting photons in a structured way. In other implementations, the depth camera can be implemented, for example, as an avalanche detector.

The emitter 106 and the depth camera 108 can be connected electrically to the PCB 110, for example, by conductive pads or wire bonds. The PCB 110, in turn, can be connected electrically to other components within a host device (e.g., a smartphone).

The sensor's control and processing circuitry (e.g., an electronic control circuit) 140 can be implemented, for example, as one or more integrated circuits in one or more semiconductor chips with appropriate digital logic and/or other hardware components (e.g., read-out registers; amplifiers; analog-to-digital converters; clock drivers; timing logic; signal processing circuitry; and/or a microprocessor). The control and processing circuitry 140 may reside in the same semiconductor chip as the depth camera 108 or in one or more other semiconductor chips. In some instances, the control and processing circuitry 140 may be external to the module 100; for example, the control and processing circuitry can be integrated into a processor for a host device in which the module 100 is disposed.

In some cases, the module 100 is integrated into a host device (e.g., a smart phone or other handheld computing device) that includes a transmissive cover (e.g., a cover glass) 132 under which the module 100 is disposed. This arrangement may, in some instances, result in spurious reflections being produced. Such spurious reflections may come, for example, from the cover glass 132 itself or from a smudge (i.e., a blurred or smeared mark such as a fingerprint or dirt, or other contamination) 130 on the cover glass 132. When data is captured by the depth camera 108, the collected data represents a combination of the received signal reflected from a target outside the module and any signal reflected from the cover glass (i.e., the cover glass itself or a smudge on the cover glass). For example, when contamination builds up on the cover glass 132, it may change the intensity of the signal reflected back from cover glass, introducing error and uncertainty to the depth measurements.

This and the following paragraphs describe a method for determining dynamically the intensity of the reflection from the cover glass and to neutralize it to improve the accuracy of depth measurements. The method preferably utilizes the same pixels 124 used for capturing the depth data. As is known, acquiring depth data at multiple (e.g., two) different modulation frequencies can be used advantageously to generate a non-ambiguous depth map. The present method uses the depth measurements of light modulation at multiple (e.g., two) frequencies—which also may be used for depth disambiguation—and decouples the information to estimate the intensity of the signal reflected by the cover glass (i.e., the cover glass itself or a smudge on the cover glass) and the intensity of the signal reflected by the target object.

The present method estimates the intensity of the signal reflected by the cover glass and the intensity of the signal reflected by a target object based at least in part, on amplitude measurements (amp1, amp2) and phase shift measurements ($\phi 1$, $\phi 2$) acquired during a measurement cycle for a particular target object, as well as phase shift measurements ($\alpha 1$, $\alpha 2$) previously acquired and stored, for example, during factory calibration of the particular module 100. In this case, the amplitude and phase shift measurements are made, respectively, using two different light modulation frequencies (f1, f2). The amplitude measurements (amp1, amp2) and phase shift measurements ($\phi 1$, $\phi 2$) represent the summation of the signals reflected by the target object and the cover glass, whereas the phase shift measurements ($\alpha 1$, $\alpha 2$) represent signals reflected by the cover glass. As explained below, the foregoing known values can be used by the control and processing circuitry 140 to estimate the intensity of the signal reflected by the cover glass and/or the intensity of the signal reflected by a target object. References to signals reflected by the cover glass include signals reflected by the cover glass itself and signals reflected by a smudge on the cover glass.

Figure 2A:
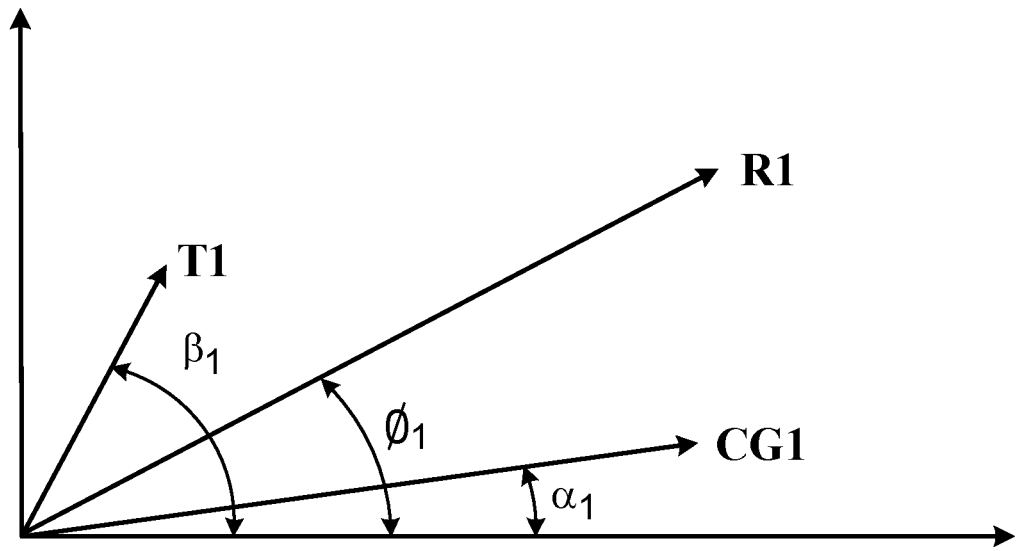
FIGS. 2A and 2B illustrate graphs representing light having a first modulation frequency (FIG. 2A) and a second modulation frequency (FIG. 2B).
Figure 2B:
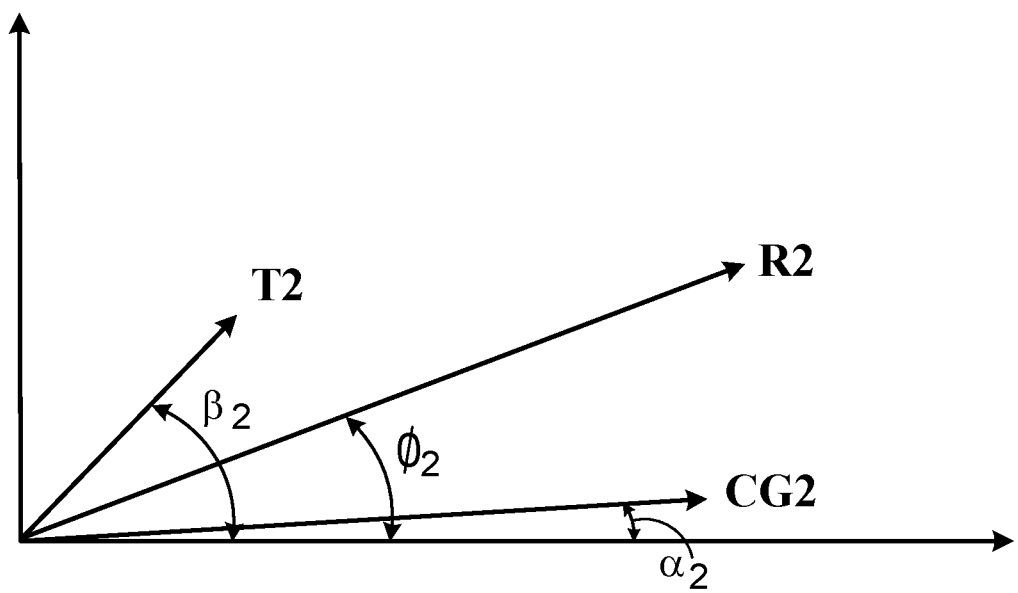

FIGS. 2A and 2B illustrate graphs (i.e., amplitude and phase), respectively, for light having a first modulation frequency f1 (FIG. 2A) and for light having a different second modulation frequency f2 (FIG. 2B). In particular, FIG. 2A illustrates a vector T1 representing a signal reflected by a target object in a scene, a vector CG1 representing a signal reflected by the cover glass, and a vector R1 representing a signal corresponding to the combination of the signals reflected by the target object and the cover glass. Likewise, FIG. 2B illustrates a vector T2 representing a signal reflected by a target object in a scene, a vector CG2 representing a signal reflected by the cover glass, and a vector R2 representing a signal corresponding to the combination of the signals reflected by the target object and the cover glass. In some implementations, the modulation frequencies are 100 MHz and 115 MHz. Other modulation frequencies may be appropriate for some implementations. Preferably, the modulation frequencies are not integral multiples of one another. FIGS. 2A and 2B also indicate the phase shifts (i.e., relative to the axis of the beam emitted by the emitter 106) for each of signals. Thus, in FIG. 2A, the phase shift for the signal reflected by the cover glass is $\alpha 1$, the phase shift for the signal reflected by the target object is $\beta 1$, and the phase shift for the combined signal is $\phi 1$. Likewise, in FIG. 2B, the phase shift for the signal reflected by the cover glass is $\alpha 2$, the phase shift for the signal reflected by the target object is $\beta 2$, and the phase shift for the combined signal is $\phi 2$.

Assuming that the amplitude of the combined signal from the target object and the cover glass at the first modulation frequency f1 is amp1, the amplitude of the combined signal from the target object and the cover glass at the second modulation frequency f2 is amp2, the amplitude of the signal reflected by the target object is b, and the amplitude of the signal reflected by the cover glass is a, it can be shown that: for the first modulation frequency f1:

$$(amp1)^2 = a^2 + b^2 + [(2ab * \cos(\alpha 1 - \beta 1)] \quad (1)$$

$$[a * \sin(\phi 1 - \alpha 1)] - [b * \sin(\beta 1 - \phi 1)] = 0 \quad (2)$$

and for second modulation frequency f2:

$$(amp2) = a^2 + b^2 + [(2ab * \cos(\alpha 2 - \beta 2)] \quad (3)$$

$$[a * \sin(\phi 2 - \alpha 2)] - [b * \sin(\beta 2 - \phi 2)] = 0 \quad (4)$$

As noted above, the amplitudes amp1 and amp2, as well as the phase shifts $\phi 1$ and $\phi 2$, are measured values obtained by the module 100 during a particular measurement cycle with respect to a target object. Further, the phase shift measurements ($\alpha 1$, $\alpha 2$) are previously stored values, acquired for example, during factory calibration of the particular module 100.

The four unknown variables (including the amplitude 'a' of the signal reflected by the cover glass and the amplitude 'b' of the signal reflected by the target) can be determined from the four equations (1) through (4) above. Various techniques can be used to estimate the values of the four unknown variables (a, b, $\beta 1$, $\beta 2$). For example, an iterative technique such as gradient descent can be used. Gradient descent is a first-order iterative optimization algorithm for finding the minimum of a function and can be used to solve a system of nonlinear equations. Thus, gradient descent can be used to estimate the values of the unknown variables in non-linear equations (1) through (4).

In some instances, for example where the area over the aperture(s) for the light emitter 106 and depth camera 108 is relatively small, the estimates for a small subset of the pixels can be used to extrapolate the values for the entire image (i.e., for all the pixels). The subset of pixels may include, for example, pixels near or at the corners and center of the pixel array.

Figure 3:
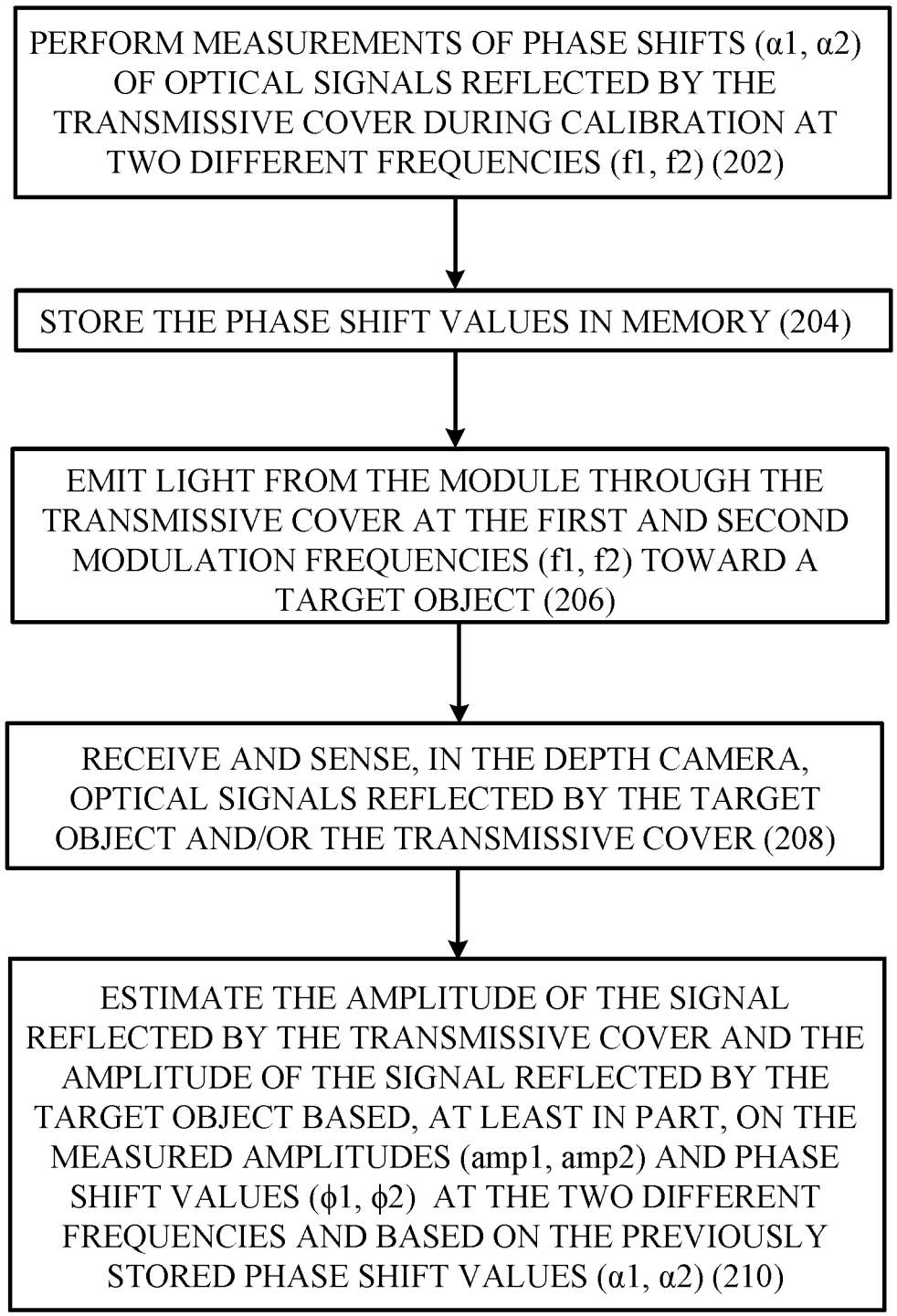
FIG. 3 is a flow chart of a method of determining depth/distance values.

FIG. 3 is a flow chart of a method of determining depth/distance values in accordance with the present disclosure. As indicated by 202, measurements of the phase shifts ($\alpha 1$, $\alpha 2$) of optical signals reflected by the transmissive cover (e.g., the cover glass) are made, for example, during calibration of a module 100 during production, and the phase shift values are stored in memory 142 (204). The memory 142 can be implemented in hardware and/or software, and may be part of the module itself or the host device. Incorporating the phase shift values ($\alpha 1$, $\alpha 2$) into the present technique can help reduce the error spread and account for manufacturing differences and/or lot-to-lot differences in the semiconductor material.

In operation, the module is operable to emit light, successively, at the first and second modulation frequencies f1, f2 toward a target object (206). The depth camera 108 receives and senses optical signals reflected by the target object and/or the cover glass 132 (208). The sensed signals, each of which may represent a combination of an optical signal reflected by the target object and an optical signal reflected by the cover glass, are provided to the processing circuitry 140, which obtains the measured amplitudes (amp1, amp2) and the phase shift values ($\phi 1$, $\phi 2$) from the sensed signals, and then estimates the amplitude 'a' of the signal reflected by the cover glass and the amplitude 'b' of the signal reflected by the target object (210).

The amplitude values ('a,' 'b') estimated by the control and processing circuitry 140 can, in some instances, provide highly accurate data and can be used to modify various components of the host device or trigger other actions. By providing more accurate depth data than in some previous techniques, the current disclosure can help improve the functionality of the host device. For example, the depth value(s) can be used for proximity sensing to determine whether to adjust the brightness of the host device's display screen (e.g., to reduce the brightness when a user has placed a smartphone next to her ear for a voice call). Similarly, if the value of the reflection from the cover glass 132 indicates there may be a smudge on the cover glass 132, the control and processing circuitry 140 can cause a visual or audible alert to be provided to the user via the host device. The alert may indicate to the user that the cover glass should be cleaned to remove contamination on its surface.

As described above, an example of a host device with respect to which the techniques described here can be used is a smartphone. However, the techniques also can be used in connection with other host devices including, for example, personal digital assistants (PDAs), laptops computers, tablet computers, wearables, bio devices, mobile robots, surveillance cameras, camcorders, and augmented reality goggles, among others.

Various aspects of the subject matter and the functional operations described in this specification can be implemented in digital electronic circuitry, or in computer software, firmware, or hardware, including the structures disclosed in this specification and their structural equivalents, or in combinations of one or more of them. Some features of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a smartphone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

A number of implementations have been described. Nevertheless, various modifications may be made without departing from the spirit of the invention. Accordingly, other implementations are within the scope of the claims.

The invention claimed is:

1. A method comprising:
   emitting light from a module at a first modulation frequency and emitting light at a second modulation frequency, the light being emitted through a transmissive cover toward a target;
   measuring first amplitude and phase shift values representing a combination of an optical signal reflected by the target and an optical signal reflected by the transmissive cover in response to the light emitted at the first modulation frequency;
   measuring second amplitude and phase shift values representing a combination of an optical signal reflected by the target and an optical signal reflected by the transmissive cover in response to the light emitted at the second modulation frequency; and
   estimating, using processing circuitry, an amplitude of an optical signal reflected by the transmissive cover and an amplitude of an optical signal reflected by the transmissive cover, the estimating being based, at least in part, on the measured first and second amplitude and phase shift values and on phase shift values obtained during calibration of the module, wherein estimating includes using an iterative process and/or using gradient descent.

2. The method of claim 1 wherein the phase shift values obtained during calibration of the module represent, respectively, a phase shift value for an optical signal reflected by the transmissive cover and a phase shift value for an optical signal reflected by a target.

3. The method of claim 1 wherein each of the optical signals reflected by the transmissive cover includes at least one of an optical signal reflected by the transmissive cover itself or an optical signal reflected by a smudge on the transmissive cover.

4. The method of claim 1 further including adjusting a characteristic of a host device in which the module is disposed in response to one or more of the estimated values.

5. The method of claim 1 further including adjusting a brightness of a display screen in response to one or more of the estimated values.

6. The method of claim 1 further including:
   determining, based on the estimated value of the amplitude of the optical signal reflected by the transmissive cover, that there may be a smudge on the transmissive cover, and
   in response to determining that there may be a smudge on the transmissive cover, causing an alert to be generated, optionally
   wherein the alert indicates that the transmissive cover should be cleaned to remove contamination on its surface.

7. An apparatus comprising:
   a transmissive cover;
   memory storing calibration-stage phase shift values;
   a light emitter operable to emit light from a module at a first modulation frequency and operable to emit light at a second modulation frequency, the light being emitted through the transmissive cover toward a target;
   a depth camera operable to measure first amplitude and phase shift values representing a combination of an optical signal reflected by the target and an optical signal reflected by the transmissive cover in response to the light emitted at the first modulation frequency, the depth camera further being operable to measure second amplitude and phase shift values representing a combination of an optical signal reflected by the target and an optical signal reflected by the transmissive cover in response to the light emitted at the second modulation frequency; and
   processing circuitry operable to estimate an amplitude of an optical signal reflected by the transmissive cover and an amplitude of an optical signal reflected by the transmissive cover, the estimating being based, at least in part, on the measured first and second amplitude and phase shift values and on the calibration-stage phase shift values, wherein the processing circuitry is operable to perform the estimating using an iterative process and/or using gradient descent.

8. The apparatus of claim 7 wherein the calibration-stage phase shift values represent, respectively, a phase shift value for an optical signal reflected by the transmissive cover and a phase shift value for an optical signal reflected by a target.

9. The apparatus of claim 7 wherein each of the optical signals reflected by the transmissive cover includes at least one of an optical signal reflected by the transmissive cover itself or an optical signal reflected by a smudge on the transmissive cover.

10. The apparatus of claim 7 further including control circuitry operable to adjust a characteristic of a host device in which the module is disposed in response to one or more of the estimated values.

11. The apparatus of claim 7 further including control circuitry operable to adjust a brightness of a display screen in response to one or more of the estimated values.

12. The apparatus of claim 7 further including processing and control circuitry operable to determine, based on the estimated value of the amplitude of the optical signal reflected by the transmissive cover, that there may be a smudge on the transmissive cover, and in response to determining that there may be a smudge on the transmissive cover, to cause an alert to be generated, optionally wherein the alert indicates that the transmissive cover should be cleaned to remove contamination on its surface.

13. An apparatus comprising:
a host device;
a transmissive cover;
memory storing calibration-stage phase shift values;
processing circuitry; and
an optoelectronic module integrated in the host device, the optoelectronic module including:
a light emitter operable to emit light from a module at a first modulation frequency and operable to emit light at a second modulation frequency, the light being emitted through the transmissive cover toward a target; and
a depth camera operable to measure first amplitude and phase shift values representing a combination of an optical signal reflected by the target and an optical signal reflected by the transmissive cover in response to the light emitted at the first modulation frequency, the depth camera further being operable to measure second amplitude and phase shift values representing a combination of an optical signal reflected by the target and an optical signal reflected by the transmissive cover in response to the light emitted at the second modulation frequency;
wherein the processing circuitry is operable to estimate an amplitude of an optical signal reflected by the transmissive cover and an amplitude of an optical signal reflected by the transmissive cover, the estimating being based, at least in part, on the measured first and second amplitude and phase shift values and on the calibration-stage phase shift values, wherein the processing circuitry is operable to perform the estimating using an iterative process and/or using gradient descent.

14. The apparatus of claim 13 wherein the calibration-stage phase shift values represent, respectively, a phase shift value for an optical signal reflected by the transmissive cover and a phase shift value for an optical signal reflected by a target.

15. The apparatus of claim 13 wherein each of the optical signals reflected by the transmissive cover includes at least one of an optical signal reflected by the transmissive cover itself or an optical signal reflected by a smudge on the transmissive cover.

* * * * *